United States Patent
Bernhardt et al.

(10) Patent No.: US 7,948,425 B2
(45) Date of Patent: May 24, 2011

(54) EXPANDABLE SIGNAL CALIBRATION TARGET

(75) Inventors: Paul A Bernhardt, Alexandria, VA (US); Chuck Hoberman, New York, NY (US); David L. Hysell, Ithaca, NY (US); Andrew C. Nicholas, Olney, MD (US); Michael W. Nurnberger, Alexandria, VA (US)

(73) Assignee: Cornell University, Ithaca (IT)

( * ) Notice: Subject to any disclaimer, the term of this patent is extended or adjusted under 35 U.S.C. 154(b) by 341 days.

(21) Appl. No.: 12/120,407

(22) Filed: May 14, 2008

(65) Prior Publication Data
US 2009/0284408 A1    Nov. 19, 2009

(51) Int. Cl.
*H01Q 15/00* (2006.01)
(52) U.S. Cl. .................. 342/5; 342/8; 342/165
(58) Field of Classification Search .................. 342/174
See application file for complete search history.

(56) References Cited

U.S. PATENT DOCUMENTS

| | | | |
|---|---|---|---|
| 3,224,007 A * | 12/1965 | Mathis | 343/915 |
| 4,942,700 A | 7/1990 | Hoberman | |
| 5,024,031 A * | 6/1991 | Hoberman | 52/81.2 |
| 5,442,360 A * | 8/1995 | Maignan et al. | 342/120 |
| 6,864,824 B2 | 3/2005 | Garon et al. | |
| 7,345,625 B1 * | 3/2008 | Urkowitz | 342/174 |
| 2006/0064726 A1 * | 3/2006 | Loner | 725/68 |
| 2007/0167247 A1 * | 7/2007 | Lindsay | 473/131 |

* cited by examiner

*Primary Examiner* — Thomas H Tarcza
*Assistant Examiner* — Timothy A Brainard
(74) *Attorney, Agent, or Firm* — Amy L. Ressing; L. George Legg

(57) ABSTRACT

A high frequency signal calibration target deployable in outer space includes an expandable and electrically conductive symmetric structure. The structure may mechanically expand from a stowed configuration to a deployed configuration. Scatter of high frequency signal off of a substantially symmetric signal calibration target may be measured to accurately calibrate systems using high frequency signals.

15 Claims, 9 Drawing Sheets

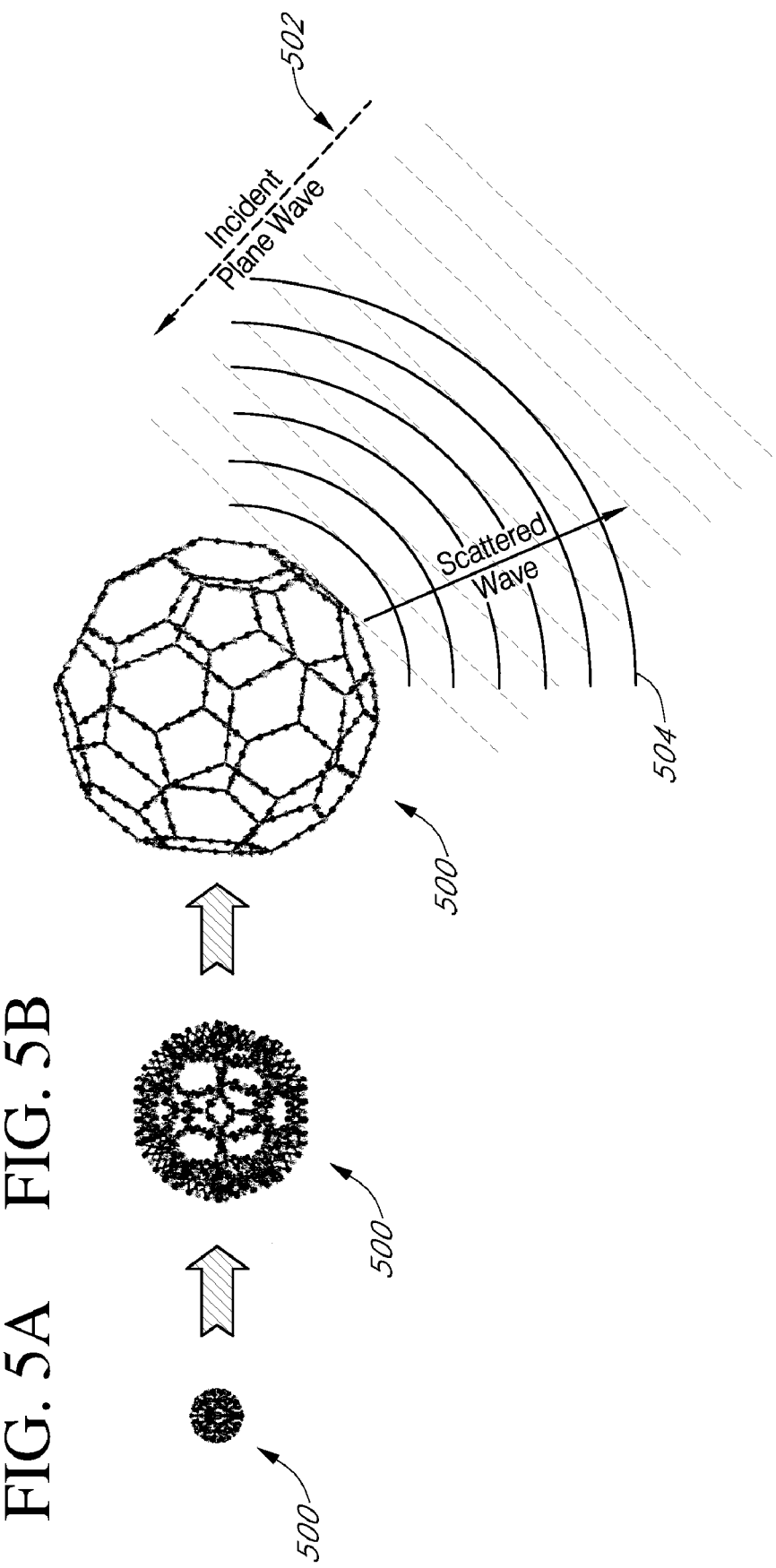

US 7,948,425 B2

EXPANDABLE SIGNAL CALIBRATION TARGET

BACKGROUND OF THE INVENTION

1. Field of the Invention

The field of the invention relates to electromagnetic signal calibration targets that may be deployed in orbit in outer space. Electromagnetic signals include any electromagnetic wave from the radio band (3 Hz to 300 GHz) as well as light waves (300 GHz to 1000 THz).

2. Description of the Related Art

Electromagnetic signals can be used to detect phenomena including ionospheric irregularities, meteor trails and moving targets. For accurate measurements of these phenomena the electromagnetic signals must be accurately calibrated. Generally, there is a need for improved calibration systems for electromagnetic signals.

SUMMARY OF THE INVENTION

In one embodiment a signal calibration target deployable in outer space comprises an expandable and electrically conductive symmetric structure. In some embodiments the structure is configured to mechanically expand from a stowed configuration to a deployed configuration. In some embodiments the deployed configuration comprises a polyhedron structure.

In some embodiments the signal calibration target is configured to calibrate a high frequency signal. In some embodiments the high frequency signal is a 3 MHz to 30 MHz signal. In some embodiments the target further comprises a plurality of retro-reflectors attached to vertices of the structure. In some embodiments the retro-reflectors reflect light waves between 300 GHz and 100 THz. In some embodiments the target further comprises a plurality of spring-loaded hinges attached to vertices of the structure. In some embodiments the spring-loaded hinges comprise torsion springs configured to apply pressure to the hinges when the structure is in the deployed state. In some embodiments the spring-loaded hinges comprise a conductivity surface material. In some embodiments the conductivity surface material comprises gold. In some embodiments the target further comprises scissor arms attached to the plurality of spring-loaded hinges.

In one embodiment a system for calibration of a high frequency signal comprises an expandable and electrically conductive symmetric structure deployed in outer space, a high frequency signal-producing device located on the earth's surface, a high frequency signal emitted from the high frequency signal-producing device to the structure and a measurement device configured to measure backscatter from the high frequency signal off of the structure.

In some embodiments the high frequency signal producing device comprises a high-frequency antenna. In some embodiments the structure is configured to mechanically expand from a stowed configuration to a deployed configuration. In some embodiments the structure comprises a polygonal shape. In some embodiments the polygonal shape approximates a spherical shape.

In one embodiment a method of calibrating a high frequency signal comprises launching an electrically conductive structure into orbit in outer space and expanding the structure from a diameter less than 2 m to a diameter greater than 8 m.

In some embodiments launching the conducting structure into orbit in outer space comprises contracting the conducting structure to a first volume with a diameter of less than 2 m. In some embodiments the method further comprises aiming a high frequency signal device at the structure. In some embodiments the method further comprises transmitting a high frequency signal off of the structure and measuring scatter of the high frequency signal off of the structure.

In one embodiment a method of calibrating a high frequency signal comprises aiming a high frequency signal device at an expandable and electrically conductive structure, transmitting a high frequency signal off of the structure and measuring scatter of the high frequency signal off of the structure.

In one embodiment a method of locating a calibration target comprises aiming a laser at an expandable and electrically conductive structure, transmitting a laser pulse off of the structure and measuring laser scatter from the structure to locate the calibration target.

In some embodiments measuring laser scatter on the structure comprises measuring laser scatter from a predetermined fixed location on the structure. In some embodiments the fixed location comprises a corner vertex of the structure. In some embodiments the corner vertex comprises a corner retro-reflector. In some embodiments measuring laser scatter off the retro-reflector determines the orientation of the structure.

BRIEF DESCRIPTION OF THE DRAWINGS

An apparatus according to some of the described embodiments can have several aspects, no single one of which necessarily is solely responsible for the desirable attributes of the apparatus. After considering this discussion, and particularly after reading the section entitled "Detailed Description" one will understand how the features of this invention provide advantages that include the ability to make and use an expandable signal calibration target.

FIG. 5A illustrates a stowed version of one embodiment of an expandable signal calibration target.

FIG. 5B illustrates a partially deployed expandable signal calibration target of FIG. 5A.

FIG. 5C illustrates a fully deployed expandable signal calibration target of FIG. 5A.

DETAILED DESCRIPTION

Figure 1:
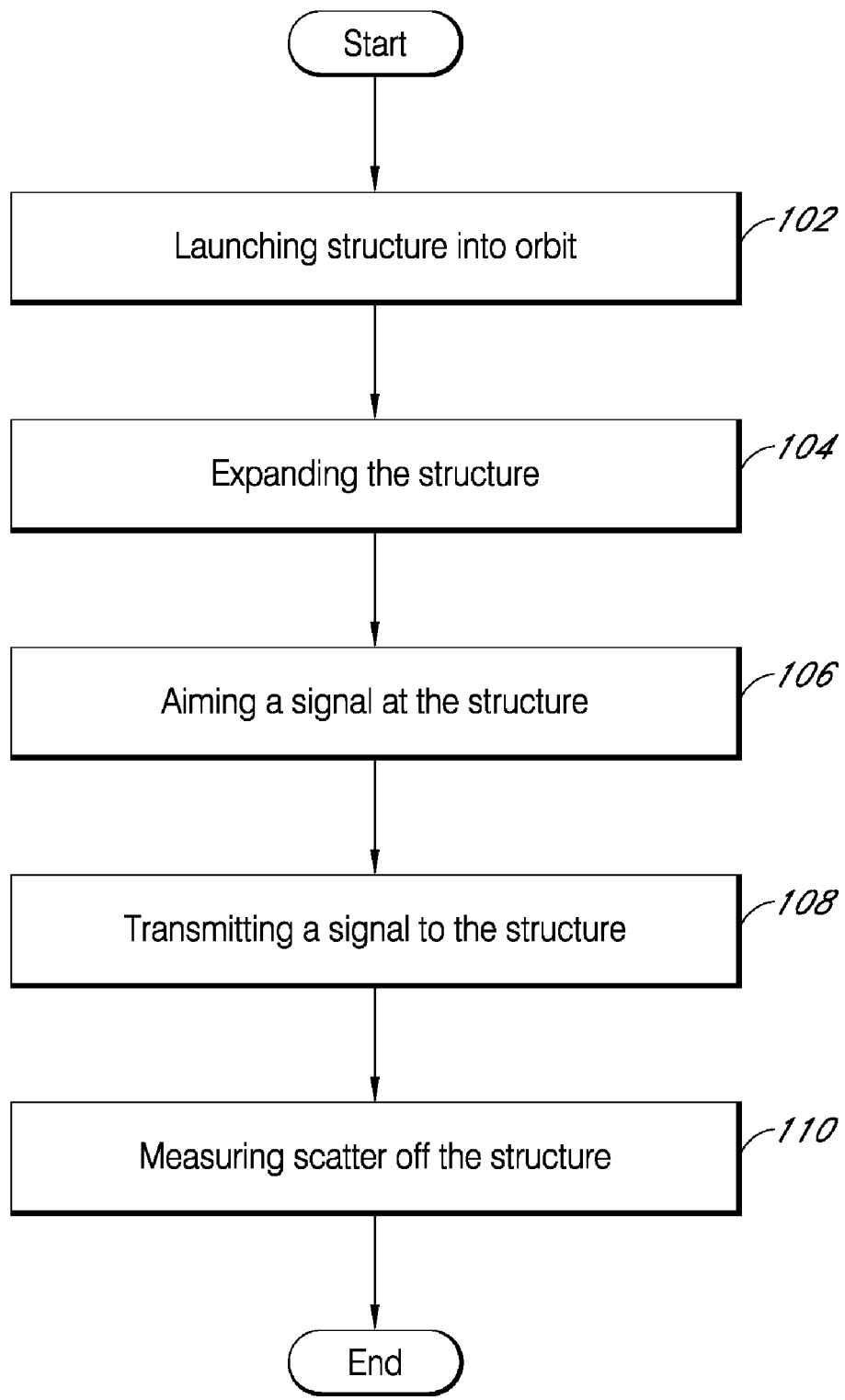
FIG. 1 is a flow diagram illustrating one embodiment of a method for calibrating a signal using an expandable structure as a target.

As will be appreciated, the following detailed description is directed to certain specific embodiments of the invention. However, the invention can be embodied in a multitude of different ways. One embodiment of the present disclosure is directed to signal calibration systems that include one or more signal calibration targets. A calibration target may be deployed in outer space so that a signal transmitted from a signal generator and scattered off the calibration target will be measured by a signal measuring device.

There is a need for precise and accurate signal calibration systems. Signals calibrated by the signal calibration system may be used by atmospheric researchers to study natural and artificial phenomena including ionospheric irregularities or backscatter from meteoric ionization. A network of high frequency signal systems can be used to track high latitude disturbances to measure convection electric fields used in space weather models. For example, as discussed in Bernhardt et al., Design and applications of a versatile HF radar calibration target in low earth orbit, Radio Science. vol. 43, RS1010, doi: 10.1029/2007RS003692. 2008, which is hereby incorporated by reference in its entirety, applications for a high frequency signal systems include the network of SuperDARN radars, or high frequency radars in Alaska, which support Alaskan High Frequency Active Auroral Research Program transmitter by detecting backscatter off field aligned irregularities generated by high power radio waves. Regardless of the precise application, however, signal systems include precise signal calibration target with a known position and a well-defined cross section.

The system may be comprised of various modules. As used herein, the term "module" refers to the various modules in the system as discussed in detail below. As can be appreciated by one of ordinary skill in the art, each of the modules comprises various sub-routines, procedures, definitional statements, and macros. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library. Further each of the modules could be implemented in hardware.

The system may include any type of electronically connected group of computers including, for instance, the following networks: Internet. Intranet, Local Area Networks (LAN) or Wide Area Networks (WAN). In addition, the connectivity to the network may be, for example, remote modem. Ethernet (IEEE 802.3). Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, an Internet includes network variations such as public internet, a private internet, a secure internet, a private network, a public network, a value-added network, an intranet, and the like. The modules can include code written in programming language such as C, C++, BASIC, Pascal, Java, FORTRAN, and Assembly Language and ran under the well-known operating system. C, C++, BASIC, Pascal, Java, and FORTRAN are industry standard programming languages for which many commercial compilers can be used to create executable code. The system is configured to contain executable code to calculate various parameters based on sensed and/or input variables.

The system may include a microprocessor for executing the above modules. The microprocessor may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the microprocessor may be any conventional special purpose microprocessor such as a digital signal processor. The microprocessor may have conventional address lines, conventional data lines, and one or more conventional control lines. As is conventional in the art, the microprocessor may be configured to execute one or more software modules. In addition to executing an operating system, the microprocessor may be configured to execute one or more software applications, including a web browser, a telephone application, an email program, or any other software application.

In one embodiment a signal calibration target comprises an expandable and electrically conductive structure suitable for signal scatter. In some embodiments the conductive structure is a conductive and symmetric structure. The symmetric structure may comprise a conductive material on an outer surface of the symmetric structure. The symmetric structure may also comprise an electrically conductive wire attached to one or more vertices of the symmetric structure. In some embodiments the symmetric structure comprises an electrically conductive wire attached to one or more faces of the symmetric structure. In some embodiments the signal is an electromagnetic signal. The signal may include a high frequency electromagnetic signal. The high frequency electromagnetic signal may include visible light, infrared radiation or microwave radiation. Also the high frequency electromagnetic signal may include a radar signal.

In one embodiment a signal calibration target comprises an expandable symmetric structure. The expandable symmetric structure may be stowed in a first configuration and expanded to a second configuration. Expandable structures in the second configuration are geometric shapes including various types of polyhedron structures. In some embodiments, the polyhedron structures are based upon approximations to a smooth spheroid.

In some embodiments a signal calibration target comprises a polyhedron structure that approximates a geodesic sphere. Geodesic spheres are derived from an icosahedron which has 12 vertices, 20 faces and 30 edges. Truncation of the icosahedron at each vertex yields a 60-vertice signal calibration target. During truncation, each edge of the triangular face of an icosahedron is divided by one-third and each corner is removed, leaving a hexagon. All vertices of this structure lie at a common distance from the center and all 90° edges have the same length. Faces are thus composed of 12 pentagons and 20 hexagons. The cross-section from the 60-vertice truncated icosahedron will vary to some degree if the vertex, edge, hexagon, or pentagon face is rotated towards the electromechanical signal. Thus, an icosahedron or a 60-vertex spherical polyhedron or a 240-vertex spherical polyhedron may approximate a sphere with a consistent diameter and thus provide excellent examples of calibration targets.

As the number of faces increases on the polyhedron, the polyhedron more closely approximates a geodesic sphere.

For example, some embodiments of the present disclosure include polyhedra, which have 60 vertices, 240 vertices, 540 vertices, 960 vertices, or any other suitable structure which approximates a geodesic sphere. Polyhedron structures with more edges and vertices more closely approximate a spherical shape. Polyhedron structures more closely approximating a sphere will have less variation in electromechanical signal cross-section and viewing direction for purposes of calibration target accuracy.

One embodiment of expandable polyhedron is a Hoberman sphere. A Hoberman sphere is a radial expansion structure including a plurality of loop assemblies that allow for self-supporting structures. The self-supporting structures maintain an overall curved geometry as they expand or collapse in a synchronized manner. Loop assemblies include angulated strut elements pivotally joined to other similar elements to form scissor pairs. The scissor pairs are pivotally joined to other similar pairs or to hub elements to form a closed loop. Expandable structures including Hoberman spheres are explained in more detail in U.S. Pat. Nos. 4,942,700 and 5,024,031 each of which is hereby incorporated by reference in its entirety.

A Hoberman expandable sphere in a collapsed state occupies a smaller volume than the Hoberman sphere in an expanded state. In a completely expanded state, the Hoberman sphere may have the form of a polyhedron structure of the types mentioned above. For example, the Hoberman sphere in an expanded state may be a polyhedron with 60, 240, 540, 960 or more vertices that closely approximates a geodesic sphere.

A solid symmetric structure of proportions and conductive properties similar to the expandable calibration targets discussed above may also be used to calibrate signals. Such a solid symmetric structure may be similar to a "metalized balloon." Nevertheless, expandable calibration targets have many advantages when compared to such a metalized balloon. First, the expandable calibration target may be collapsed to a small volume for launching into space. Second, after the expandable calibration target has been fully deployed, it comprises a frame of edges and vertices that is not subject to the same atmospheric drag as the metalized balloon. Thus, the expandable calibration target can stay longer in orbit. Both the expandable target and the metalized balloon may approximate spherical targets. For the expandable target the approximation approaches a spherical target as the number of edges and vertices are increased. Further, the expandable target approximation approaches a spherical target as the individual edges of the expandable calibration target are made with a width smaller than the wavelength of the electromagnetic radiation scattered off of the expandable calibration target.

As mentioned above, some embodiments of expandable calibration structures are based on Hoberman spheres. A Hoberman sphere comprises multiple "scissor arms" connected by a series of hinges and struts. The angles and length for each strut in the Hoberman scissor arms are determined by geometric considerations. Two identical scissor arms have lengths $L_1 \geq L_2$ joined at a pivot with angle $\theta_{12}$. In addition, $L_3$ is defined the distance between the end points of each arm. The pivot point moves along a vertical line with a radial distance $R_b$ from the origin. The end points follow converging lines that have radial distances $R_a$, $R_c$, $R_d$, and $R_e$ from the origin. Using the sine law, a constant $L_0$ of the scissors is given by $$L_0 = \frac{L_1}{\sin\theta_{23}} = \frac{L_2}{\sin\theta_{13}} = \frac{L_3}{\sin\theta_{12}}$$

where the angles are defined in Figure C1 of Berhardt et. al., supra. When the scissors are fully expanded, $R_b = R_H$ where $$R_H = L_0 \cos\left(\frac{\theta_{13} - \theta_{23}}{2}\right)$$

When $R_b = L_1$, the scissors are fully collapsed. Internal angles ($\theta_{12}$, $\theta_{13}$, $\theta_{23}$) of the triangle with sides ($L_1$, $L_2$, $L_3$), also determine the angles lines emerging from the origin. Using sine and cosine laws yields the variation of the radial distances to the scissors end points as the pivot radius, $R_b$ is varied $$R_a = L_0 \sqrt{1 - \cos[\theta_{13} + \sin^{-1}(R_b/L_0)]}$$

$$R_c = L_0 \sqrt{1 - \cos[\theta_{23} - \sin^{-1}(R_b/L_0)]}$$

$$R_d = L_0 \sqrt{1 - \cos[\theta_{23} + \sin^{-1}(R_b/L_0)]}$$

$$R_e = L_0 \sqrt{1 - \cos[\theta_{13} - \sin^{-1}(R_b/L_0)]}$$

Choice of the dimensions and angles for the arms can be determined by the selection of three parameters, $R_1$ the fully deployed radius to an end point with the two scissor arms merged together, $L_3$ the distance between neighboring vertices at deployment and $L_4$ the minimum value of $R_d$ when the sphere is stowed. With these given parameters all the other mechanical specifications are given by $$\cos\left(\frac{\theta_{12}}{2}\right) = \frac{L_3}{2R_1} \cdot \sin(2\theta_{23}) = \frac{L_4}{L_3}\sin(2\theta_{12}),$$

$$\theta_{13} = \pi - \theta_{12} - \theta_{23}$$

$$L_0 = \frac{L_3}{\sin\theta_{12}} \cdot L_1 = L_0\sin(\theta_{23}), L_2 = L_0\sin(\theta_{13})$$

and $$R_H = L_0\cos\left(\frac{\theta_{13} - \theta_{23}}{2}\right)$$

When radar is the electromagnetic signal reflected off of the expandable calibration target the amount of power reflected back to the transmitter or to a measurement device may be calculated based on monostatic radar cross-section. The equation below incorporates radar cross-section with transmitting system and receiving system parameters and range to target:

$$\frac{P_r}{P_t} = \frac{G^2}{L^2} \frac{1}{(4\pi R^2)^2} \frac{\lambda_0^2}{4\pi}\sigma = \frac{C_0(f, \theta, \phi)}{R^4}\sigma(f)$$

where P is received (r) and transmitted (t) power. G is gain, L is loss, R is range, $\lambda_0$ is wavelength, $\sigma$ is radar cross-section and $C_0$ is a radar system parameter. The directional antenna gain $G(f, \theta, \phi)$ for a ground radar system is dependent on the radar frequency (f) on the zenith angle to the target ($\theta$) and the azimuth angle to the target ($\phi$). The system losses L(f) are only frequency dependent. The monostatic cross-section $\sigma(f)$ of a spherical radar target is dependent on frequency but is independent of θ and φ. In terms of incident ($E_i$) and scattered ($E_s$) electric fields, the total bistatic radar cross-section is defined as $$\sigma_{Total}(\phi_i, \theta_i; \phi_s, \theta_s) = 4\pi R^2 \frac{|E_s(R, \phi_s, \theta_s)|^2}{|E_i(\phi_i, \theta_i)|^2}$$

where the incident field $E_i(\phi_i, \theta_i)$ is a plane wave propagated along a direction given in spherical polar coordinates by the angles $\phi_i$ and $\theta_i$, and the scattered field $E_s(R, \phi_s, \theta_s)$ is a spherical wave in the far field with the form $E_s(R, \phi_s, \theta_s) = e_s(\phi_s, \theta_s) \text{Exp}(-jk_0 R)/R$. For backscatter the incident and scattered directions lie along the same path with opposite directions.

Measurements of the ratio $P_r/P_t$ (from the first equation in the paragraph above) with a known σ over a range of look directions and frequencies permits estimation of the system parameter $C_0(f, \theta, \phi)$. The radar cross-section for any scattering medium is found from $$\sigma_{Measured} = \frac{R^4}{C_0(f, \theta, \phi)} \frac{P_r}{P_t}\bigg|_{Measured}$$

Another parameter that is affected by scatter from a target is the polarization. The complex electric field vector is completely determined by its components $E_\phi$ and $E_\theta$ with the formula $$R = \frac{E_\theta}{E_\phi}.$$

With R=±j, the waves are right-handed or left-handed circular polarized, respectively. Each electromagnetic wave E can be decomposed into these two circularly polarized waves according to $$E = E_\theta \theta + E_\phi \phi$$

$$E_{RC} = E_{RC}(\theta - j\phi) \text{ where } E_{RC} = \frac{E_\theta + jE_\phi}{2}$$

$$E_{LC} = E_{LC}(\theta + j\phi) \text{ where } E_{LC} = \frac{E_\theta - jE_\phi}{2}$$

where θ and φ are unit vectors. An initial electric field that is right hand circular polarized can scatter into both right hand circular polarized and left hand circular polarized modes. The radar cross-sections for scattering into the same and different modes are $$\sigma_{RH}(\phi_i, \theta_i; \phi_s, \theta_s) = 8\pi R^2 \frac{|E_{RC}(R, \phi_s, \theta_s)|^2}{|E_i(\phi_i, \theta_i)|^2}$$

$$\sigma_{LH}(\phi_i, \theta_i; \phi_s, \theta_s) = 8\pi R^2 \frac{|E_{LC}(R, \phi_s, \theta_s)|^2}{|E_i(\phi_i, \theta_i)|^2}$$

A perfect sphere does not change the polarization of the reflected wave so for a right hand circular polarized incident wave, $\sigma_{RH} = \sigma_{Total}$ and $\sigma_{LH} = 0$. For the expandable calibration target to be a useful radar calibration target, most of the energy radiated should come back with the same polarization. A measure of the amount of electromagnetic energy coupled into the other polarization is the ratio of the polarization radar cross section given by $$\rho_{LH-RH}(\phi_i, \theta_i; \phi_s, \theta_s) = \frac{|E_{LC}(R, \phi_s, \theta_s)|^2}{|E_{RC}(R, \phi_s, \theta_s)|^2} = \frac{|E_\theta - jE_\phi|^2}{|E_\theta + jE_\phi|^2}$$

where $\rho_{LH-RH}=0$ for a perfect sphere and $\rho_{LH-RH}=1$ if the initial right hand circular polarized wave is scattered into the left hand circular polarized wave.

A 10-m spheroid or metal balloon was selected as the baseline for radar cross-section comparisons. A sphere with another dimension will have radar cross-section that scales in frequency with ratio of sphere diameter to radio wavelength ($2r/\lambda$) and scales with cross-section magnitude as the projected area of the sphere ($\pi r^2$). This scaling applies to the Rayleigh, Mie. and geometric optics regions of scatter. The 10-m sphere should be large enough to provide usable echoes for ground high frequency radars.

The radar cross-section is computed for frequencies up to 50 MHz. Below 4 MHz, the cross-section monotonically drops off as $\lambda^4$ where λ, the radio wavelength, is less than the sphere radius r. This is called Rayleigh scattering. In general, Rayleigh scattering is the scattering of electromagnetic radiation by particles with dimensions much smaller than the wavelength of the radiation, which results in angular separation of colors. For high frequencies with $\lambda \ll r$, the radar cross-section is approximately $\pi r^2$ in the asymptotic geometric optics limit. Strong localized minima in radar cross-section for the 10-m sphere are found near 17 MHz and 29 MHz.

Next, the radar cross-section is computed for a conducting polyhedron as a radar target. All of the 10-m diameter wire frames in FIG. 2 will reflect high frequency radar signals. Their radar cross-section, however, will fluctuate as the wire frame is rotated. The objective of the calibration target design is to produce a minimal variation in radar cross-section, 0.5 dB, as the target orientation is changed.

As mentioned briefly above, the particular physical dimensions of the signal calibration target will determine electromechanical signal scattering properties. High frequency scattering includes both Mie Theory scattering, which is a complete analytical solution of maximal equations for the scattering of electromagnetic radiation by spherical particles. Solutions to Mie Theory scattering are valid for all possible ratios of diameter to wavelength, although the technique results in numerical summation of infinite sums. In an original formulation, it is assumed a homogeneous, isotropic and optically linear material irradiated by an infinitely extending plane wave. However, solutions for layered spheres are also possible. In one solution formulation, the incident plane wave as well as the scattering field may be expanded into radiating spherical vector wave functions. The internal field is expanded into regular vector wave functions. By enforcing a boundary condition on the spherical surface, the expansion coefficients of the scattered field can be computed.

The general Mie scattering for radar echoes from spheres is given by Ruck et al. Radar Cross Section Handbook, Plenum, New York, (1970), which is hereby incorporated by reference in its entirety. Far field solutions exist when the distance to the sphere (R) is much larger than the radius of the sphere (r). For a perfectly conducting sphere with R>>r, the monostatic cross-section looking in the direction of the incident polarization is given by $$\sigma(\lambda_0) = \frac{4\pi}{k_0^2}\left|\sum_{n=1}^{\infty}(-i)^{n-1}\frac{n(n+1)}{2}(A_n+iB_n)\right|^2$$

where $$A_n = -(-i)^n \frac{2n+1}{n(n+1)}\frac{j_n(k_0 r)}{h_n^{(1)}(k_0 r)}.$$

$$B_n = (-i)^{n+1}\frac{2n+1}{n(n+1)}\frac{[k_0 r j_n(k_0 r)]'}{[k_0 r h_n^{(1)}(k_0 r)]'},$$

$$k_0 = \frac{2\pi}{\lambda_0} = \frac{2\pi f}{c} \cdot []' = \frac{\partial}{\partial(k_0 r)},$$

$$j_n(z) = \sqrt{\frac{\pi}{2z}}J_{n+\frac{1}{2}}(z),\ h_n^{(1)}(z) = \sqrt{\frac{\pi}{2z}}H_{n+\frac{1}{2}}^{(1)}(z)$$

$J_n(z)$ is the cylindrical Bessel Function of the first kind, $H_n(z)$ is the Spherical Bessel function of the third kind and the wavelength is related by the speed of light c to the radar frequency by $\lambda_0 = c/f$. The radar cross-section is computed numerically from with a finite truncation of the infinite series. In the Rayleigh region with $k_0 r < 0.4$, the backscatter cross-section is given by $$\sigma(\lambda_0 >> r) = \pi r^2 9(k_0 r)^4$$

In the high frequency (or short wavelength limit $k_0 r > 20$) the spherical radar cross-section is simply the geometric projection area $$\sigma(\lambda_0 << r) = \pi r^2$$

In some embodiments, the high frequency signal calibration target comprises a plurality of reflectors attached to fixed locations on the structure. In some embodiments the fixed locations are vertices of the structure. The addition of small optical quarter cube reflectors to each vertex of the expandable signal calibration target will permit a satellite laser ranging of the high frequency target. Quarter reflectors provide a reflection cross-section for visible light that may depend on the incident angle of the light. With one quarter cube on each vertex, those that are facing towards a ground laser system will reflect visible light back to the source. The total intensity of the reflected light will vary as the spherical target rotates. Using a 60-vertice signal calibration target embodiment of the present disclosure and the tilt angle dependence on the optical cross-section, the fluctuations in total optical cross-section are calculated for rotation around several axis on the expandable signal calibration target. The rotation rate for the target can be determined for the temporal fluctuations in the reflected light. The lowest harmonic component of the frequency spectrum gets the rotation. Satellite laser ranging sites can therefore provide both position and rotation information on the orbiting polyhedron expandable calibration target in space. This information can provide precise location of the target for high frequency radar calibration. Any small fluctuations in the high frequency radar return signal can thereafter be correlated with the independently measured rotation of the signal calibration target. Reflectors that may be used with embodiments of expandable calibration targets include those described in U.S. Pat. No. 6,864,824, which is hereby incorporated by reference in its entirety.

In some embodiments, the signal calibration target comprises a plurality of spring-loaded hinges attached to vertices of the structure, which are described more fully with reference to FIG. 3 below. These spring-loaded hinges may include torsion hinges configured to apply a pressure to hinges when the structure is in a deployed state so as to assist in expanding the calibration target. In some embodiments, the high frequency calibration target comprises a conductivity surface material applied to the structure. In some embodiments, this surface material comprises gold.

As mentioned above, in some embodiments a system for calibrating a signal comprises an expandable conductive symmetric structure. The conductive symmetric structure may be deployed in outer space. In some embodiments the expandable conductive symmetric structure is coupled with a signal generating device. The signal generating device emits a signal directed at the expandable conductive symmetric structure. A measurement device may be coupled to the expandable conductive symmetric structure to measure backscatter from the signal off of the structure. The signal generating device and/or the measurement device may be configured with a microprocessor to execute one or more software modules. In some embodiments the signal generating device and/or the measurement device is configured to execute a software module to calculate the amount of power reflected back to the transmitter or to a measurement device based on monostatic radar cross-section. Some embodiments of the system are configured with a microprocessor and/or one or more software modules to calculate and display solutions to one or more of the equations described herein. The solutions of the one or more equations can be used to calibrate electronic systems and targets described herein. One embodiment of such a system is discussed in greater detail below with reference to FIGS. 5A, 5B and 5C.

The embodiments described above are also illustrated with respect to the description of the figures below.

FIG. 1 is a flow diagram illustrating one embodiment of a method for calibrating a signal using an expandable calibration structure. The method comprises launching an electrically conductive structure into orbit in outer space 102. Generally, the orbit is a low earth orbit. In some embodiments the diameter of the structure in a stored state is less than approximately 10, 9, 8, 7, 6, 5, 4, 3, 2, 1, 0.5, 0.2 m. In some embodiments, the structure in a stored state has a diameter less than approximately 0.5 m. In some embodiments, the diameter of the expanded structure is greater than 1, 2, 3, 4, 5, 6, 7, 8, 9, 10, 15 or 20 m. In some embodiments the fully expanded structure has a diameter of greater than approximately 2 m.

Expanding the structure 104 changes the volume of the structure from a collapsed configuration to a fully expanded configuration. In a fully expanded configuration the structure may be a polyhedron structure with 60 vertices, 90 vertices, 240 vertices, 540 vertices, 960 vertices, or more.

After the structure is fully expanded, the method of calibrating the signal includes aiming a signal at the structure 106 and transmitting a signal to the structure 108. In some embodiments the signal is an electromagnetic signal. The electromagnetic signal may be visible light, infrared radiation, microwave radiation or radar. In some embodiments transmitting the signal 108 comprises emitting at least one radar signal.

Following transmission of a signal to the structure, the signal is reflected off the structure. The method of calibrating the signal includes measuring scatter of the reflected signal off of the structure 110. Measuring scatter off of the structure 110 may be accomplished at the location of transmitting the signal to the structure 108 or it may be accomplished at a location removed from the signal transmission. Software modules coupled to processors at a signal generator or at a signal measurement device may be used to measure signal scatter and/or to calibrate signal reflected off the structure.

Figure 2A:
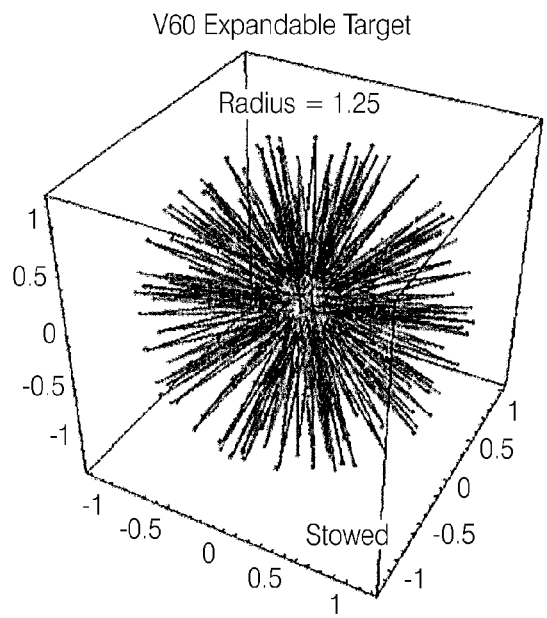
FIG. 2A illustrates one embodiment of an expandable signal calibration target in a stowed configuration.
Figure 2B:
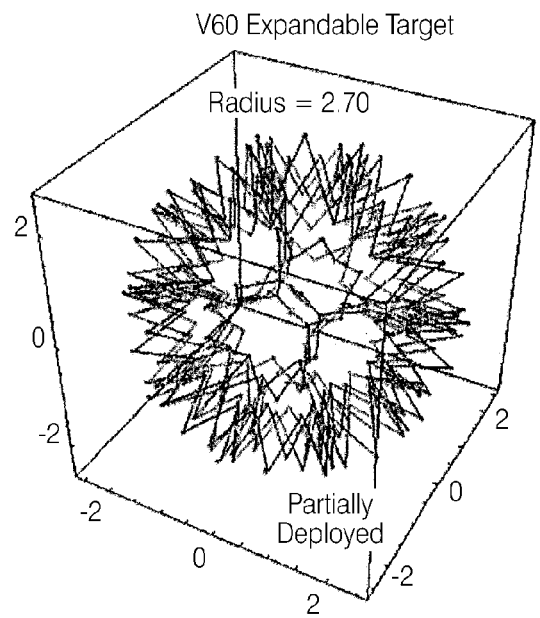
FIG. 2B illustrates the embodiment of FIG. 7A in a partially deployed configuration.
Figure 2C:
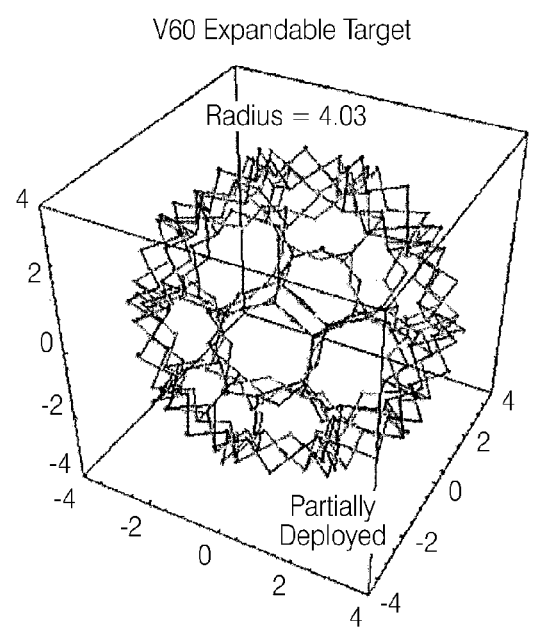
FIG. 2C illustrates the embodiment of FIG. 7A in a more fully deployed configuration.
Figure 2D:
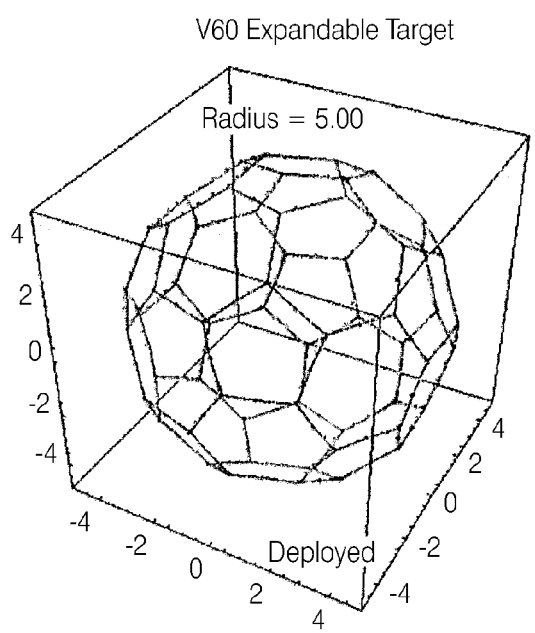
FIG. 2D illustrates the embodiments of FIGS. 7A, 7B and 7C in a fully deployed configuration.

The FIGS. 2A-2B illustrate the deployment of one embodiment of an expandable signal calibration target from a stowed configuration to a deployed configuration. In FIG. 2A the 60-vertice expandable target comprises a radius of approximately 1.25 m in a stowed configuration. In the partially deployed configuration of FIG. 2B, the 60-vertice expandable target of FIG. 2A comprises a radius of approximately 2.70 m. In FIG. 2C a further deployed 60-vertice expandable target comprises a radius of 4.03 m. In FIG. 2D a fully deployed 60-vertice expandable target of the embodiment of FIG. 2A, 2B and 2C comprises a radius of 5.00 m. Thus, from a stowed configuration illustrated in FIG. 2A to a fully deployed configuration depicted in FIG. 2D, this embodiment of a 60-vertice expandable signal calibration target is expanded from a radius of 1.25 m to a radius of 5.0 m.

Figure 3:
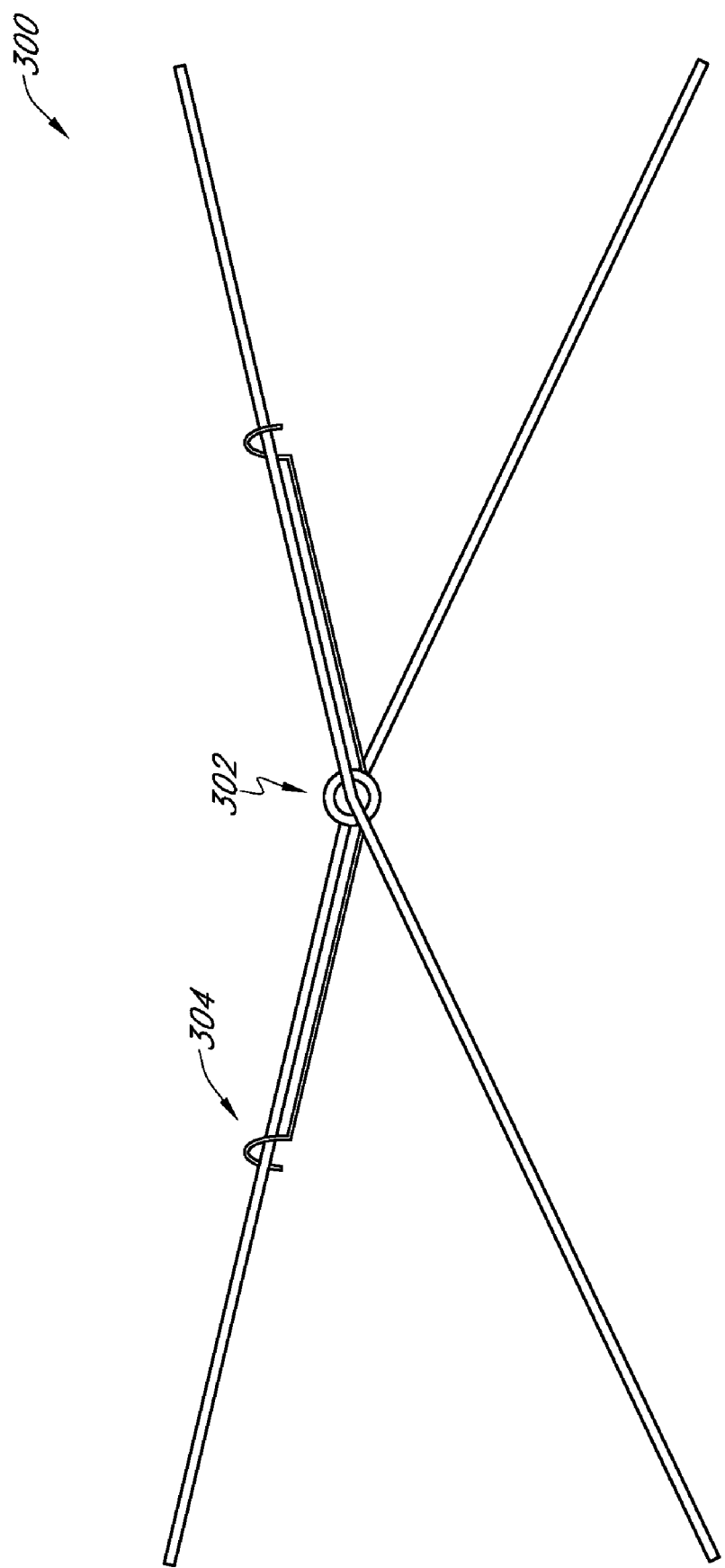
FIG. 3 illustrates a detail of a torsion spring, which provides an opening force for an expandable structure.

FIG. 3 illustrates a detail of a spring-loaded hinge which is part of one of the vertices of one embodiment of the present disclosure. In particular, this detail illustrates a scissor 300 comprising a pivot 302 and a spring 304. The spring 304 is configured to apply pressure to a stowed configuration of an expandable signal calibration target. Multiple hinges may be "preloaded" with the spring 304, to provide the deployment of force to expand the expandable signal calibration target from a stowed configuration to a completely deployed configuration. The spring 304 may be placed on any of the expandable structures discussed herein.

Figure 4A:
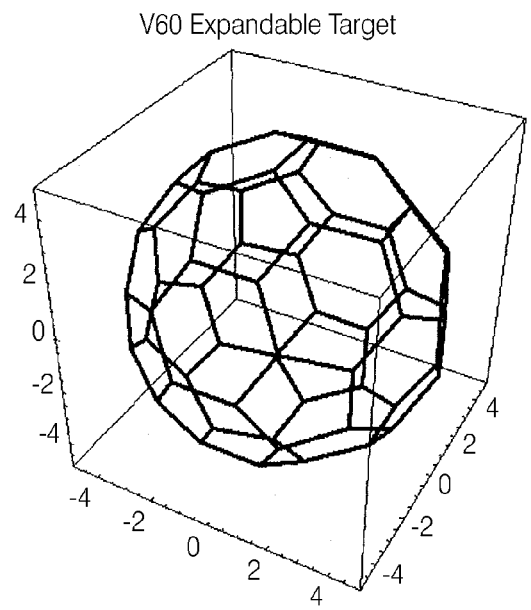
FIG. 4A illustrates one embodiment of the present invention including an expandable signal calibration target with 60 vertices.
Figure 4B:
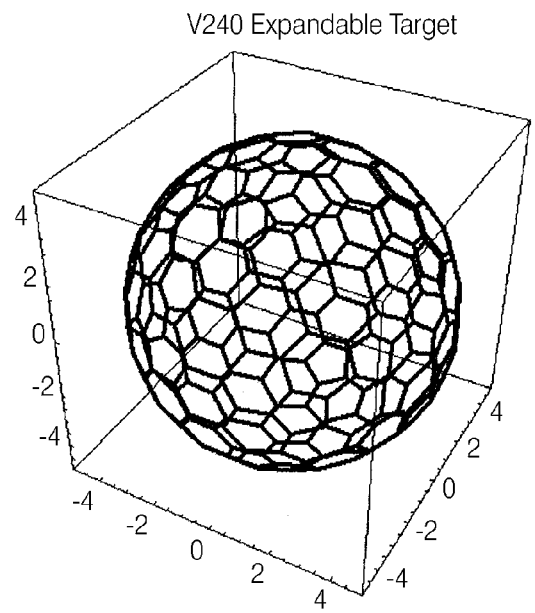
FIG. 4B illustrates one embodiment of an expandable signal calibration target with 240 vertices.
Figure 4C:
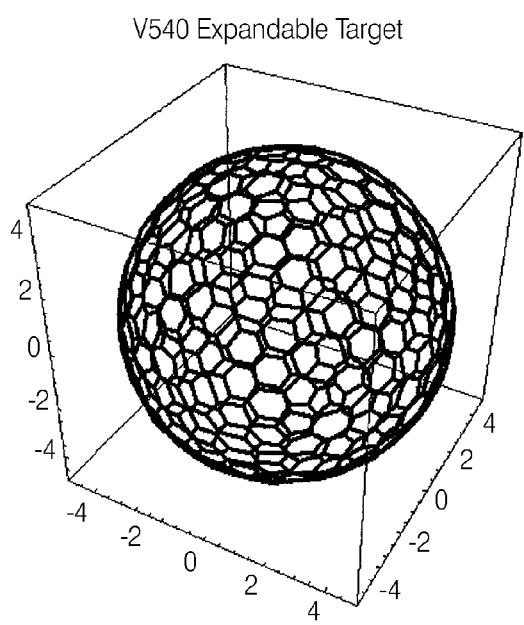
FIG. 4C illustrates one embodiment of an expandable signal calibration target with 540 vertices.
Figure 4D:
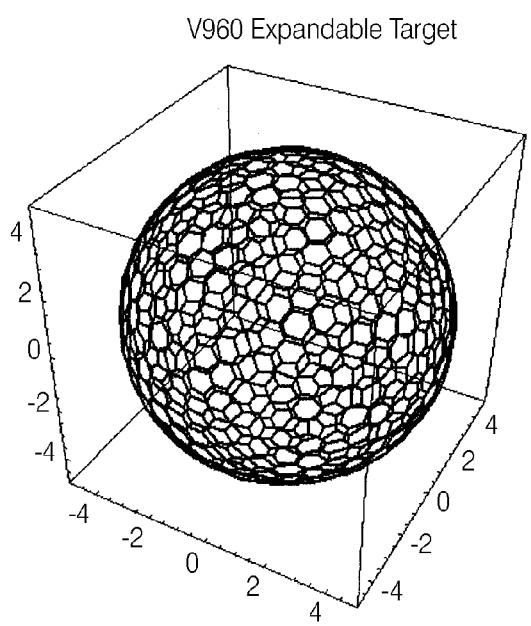
FIG. 4D illustrates one embodiment of an expandable signal calibration target with 960 vertices.

Each of FIGS. 4A-4D illustrate a geometry of an expandable signal calibration target which structures are aspect independent for purposes of high frequency signal cross-section measurements. FIG. 4A illustrates a 60-vertice expandable signal calibration target. FIG. 4B illustrates a 240-vertice expandable signal calibration target. FIG. 4C illustrates a 540-vertice expandable signal calibration target. FIG. 4D illustrates a 960-vertice expandable signal calibration target.

FIGS. 5A, 5B and 5C illustrate one embodiment of an expandable calibration target in different levels of deployment.

FIG. 5A illustrates a stowed configuration of an expandable signal calibration target. In some embodiments the expandable signal calibration target 500 has a diameter of less than or equal to 10, 5, 4, 3, 2, 1, 0.5, 0.4, 0.3, 0.2, 0.1 or 0.05 m diameter. FIG. 5B illustrates a partially deployed signal calibration target 500 of the signal calibration target 500. The signal calibration target has partially expanded to less than its full diameter.

FIG. 5C is a fully expanded signal calibration target 500. In a fully expanded configuration, the expandable calibration target 500 has 60 vertices and a diameter of greater than or equal to 2, 3, 4, 5, 6, 7, 8, 9, 10, 15, 20 or 50 m. An incident plane wave 502 may be propagated towards the signal calibration target 500. The incident plane wave 502 is reflected from the signal calibration target 500 in a scattered wave 504. A signal generating device may be configured with a microprocessor to transmit the incident plane wave 502. The scattered wave 504 may be measured by a measurement device configured to execute a software module to calculate and display solutions to one or more of the equations described herein. Solutions of the one or more equations can be used to calibrate the signal calibration target 500.

In some embodiments, the expandable signal calibration target 500 comprises a known cross-section which is independent of observation direction within 0.5 dB. As discussed below with reference to FIG. 6, when deployed in orbit in outer space, the expandable signal calibration target may be targeted with and tracked using laser satellite tracking. The orbital position and velocity will therefore be known with the required accuracy for high frequency signal calibration. When the expandable signal calibration target is launched in a stowed configuration, it can thereafter be expanded to a diameter of approximately 10 m. After expansion, the frame of the expandable signal calibration target 100 is in the form of a polyhedron. The structure of the polyhedron is based upon the truncated icosahedrons mentioned above. Many materials can be used for the frame structure. For example, the frame of the expandable signal calibration target may comprise aluminum or other material with similar strength and density. The frame may include metal plating. The metal plating may comprise gold or other conductive material.

Figure 6:
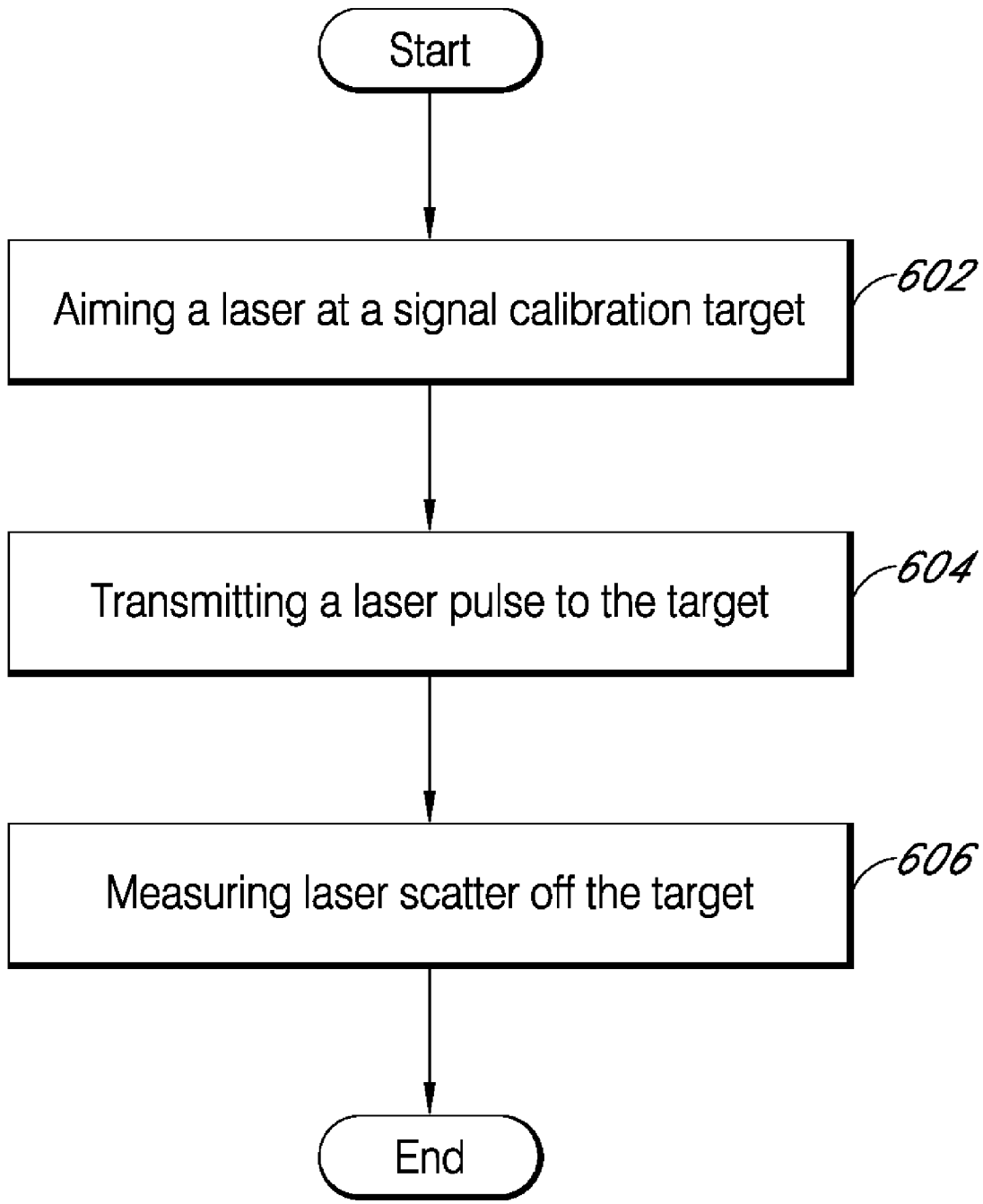
FIG. 6 is a flow diagram illustrating one embodiment of a method of locating a calibration target.

FIG. 6 is a flow diagram illustrating one embodiment of a method of locating a calibration target. The method comprises aiming a laser in the general direction of a calibration target 602 and transmitting a laser pulse to the structure 604. In some embodiments the calibration target comprises an expandable calibration target. In some embodiments the calibration target comprises a symmetric structure. In some embodiments the calibration target comprises a conductive structure. After transmitting the laser pulse to the structure 604, the method comprises measuring laser scatter off the target 606. Laser pulses may be scattered off of reflectors at predetermined locations on the structure. In some embodiments the predetermined locations are vertices of a symmetric polyhedral structure. As noted above, in some embodiments reflectors comprise retro-reflectors. In some embodiments the reflectors comprise quarter reflectors. Temporal fluctuations in the scattered or reflected signal can be used to determine precise location and orientation of the calibration target using software modules and/or microprocessors. Software modules and/or microprocessors can also be used to locate the calibration target based on calculations using one or more signals reflected off the retro-reflectors and then measured. Thus, some embodiments of a system for locating a calibration target are configured with a microprocessor and/or one or more software modules to calculate and display solutions to one or more of the equations such as those described herein. The solutions of the one or more equations can be used to locate the target, determine the orientation of the target and/or calibrate the system.

Figure 7:
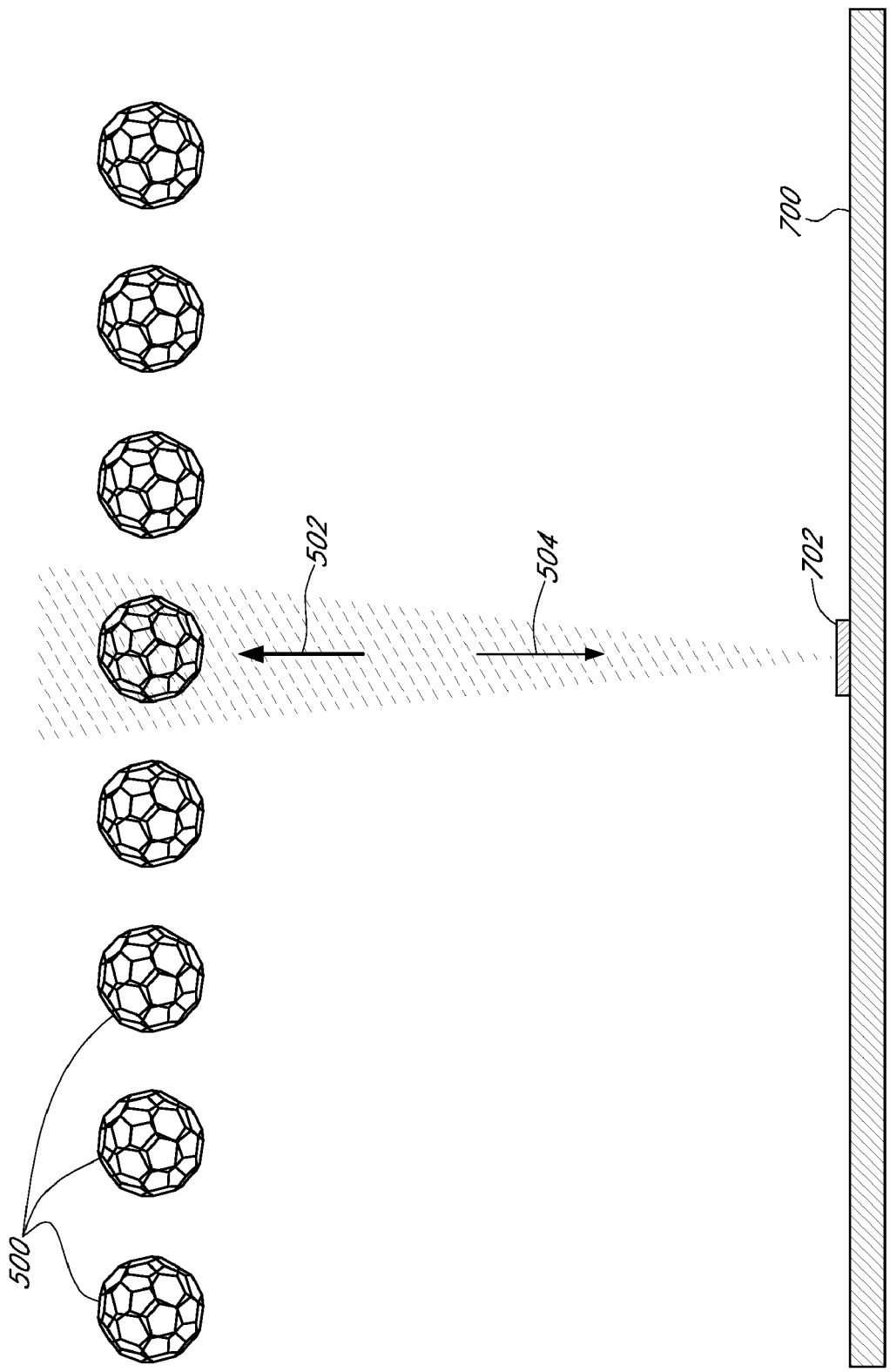
FIG. 7 illustrates a system for calibrating high frequency signals.

FIG. 7 illustrates one embodiment of a system for calibrating a high frequency signal. High frequency expandable signal calibration targets 500 are in orbit. A high frequency wave generator 702 is located on the earth's surface 700. The high frequency wave generator 702 transmits a high frequency signal which is reflected off of the expandable signal calibration target 500 in a scattered wave signal 504. The scattered wave signal 504 returns to the earth's surface 700 and may be measured by a wave measurement device. In this embodiment of FIG. 7, the high frequency wave generator 702 also serves as a wave measurement device for the scattered wave signal 504. In other embodiments the measurement device is at a location remote from the high frequency wave generator 702. Thus, as the expandable signal calibration target flies through the high frequency beam 502, the scattered wave signal 504 (backscatter) may be measured by the high frequency wave generator/wave measurement device 702. The high frequency system parameters may thus be calibrated so other targets may be scanned and accurately measured. Computed high frequency calibration signal curves illustrate a large cross-section with minimal variation.

The radar constant can be computed by the following equations:

$$\frac{(4\pi)^2}{P_t} \frac{4\pi}{\lambda_0^2} \frac{L(\theta)^2}{G(\theta)^2} = \frac{\sigma_0}{P_{r0}(\theta)R_0^4} \equiv C_0(\theta)$$

$$\sigma(R, \theta) = C_0(\theta) P_r(R, \theta) R^4$$

The high frequency wave generator/wave measurement device 702 may be configured with a microprocessor to execute one or more software modules. In some embodiments the high frequency wave generator/wave measurement device 702 is configured to calculate and display solutions for the radar constant using the equations described above. Some embodiments of the system are configured with a microprocessor and/or one or more software modules to calculate and display solutions to one or more of the equations described herein. The solutions to the one or more equations described herein can be used to calibrate electromagnetic signals or electronic systems using the expandable signal calibration target 500.

Figure 8:
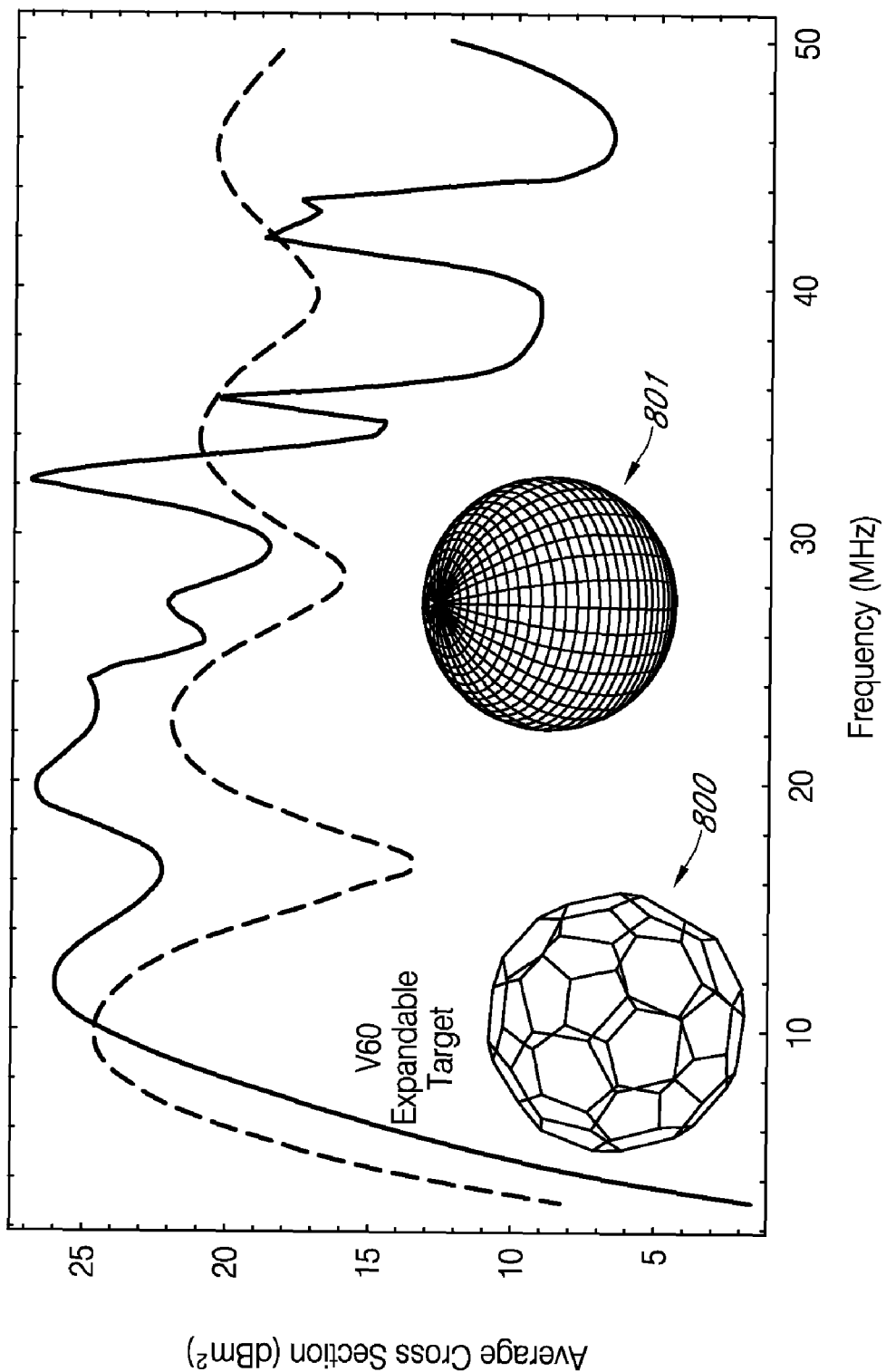
FIG. 8 illustrates a graph of average cross-sectional area versus frequency comparing one embodiment of an expandable signal calibration target and a reference sphere.

FIG. 8 illustrates an average value of high frequency calibration signal for all viewing angles. The full range of radar cross-section change variations with radar observation direction is obtained by stepping a WIPL-D 3-D Electromagnetic Solver through all target angles. See Koludzija et al., WIPLE-D Software Users Manual (2004), which is hereby incorporated by reference in its entirety. Between 9 and 33 MHz, the expandable signal calibration target has a larger high frequency cross-section than the spheroid of a comparable size and a continuous solid conducting surface. The maximum high frequency calibration signal calculated deviation shows that a 10 m diameter 60-vertice expandable signal calibration target is well suited for frequencies less than 23 MHz where the deviation is less than 0.5 dB. Above 23 MHz a local maximum in high frequency signal variation with orientation is found to be 9.6 dB at 26 MHz. This makes the 60-vertice expandable signal calibration target of less use in the 26 to 29 MHz band unless the orientation of the target is known. The difference in behavior of the high frequency signal can be explained in terms of the resonances of the edges and faces of the pentagons and hexagons in the expandable signal calibration target.

When a Hoberman sphere is fully expanded for use as a signal calibration target the struts along the edges are joined at mechanical hinges where electrical resistance is a factor. Further, the internal and external hinges of the Hoberman sphere do not fully merge together when the calibration target is fully expanded. Resistance between edges of the calibration target is minimized when the structure comprises a highly conductive material on surfaces with maximum pressure over maximum area at hinge interfaces. As mentioned above with reference to FIG. 3, springs may be placed on one or more hinges to apply pressure to hinges when the calibration target is fully expanded.

Figure 9:
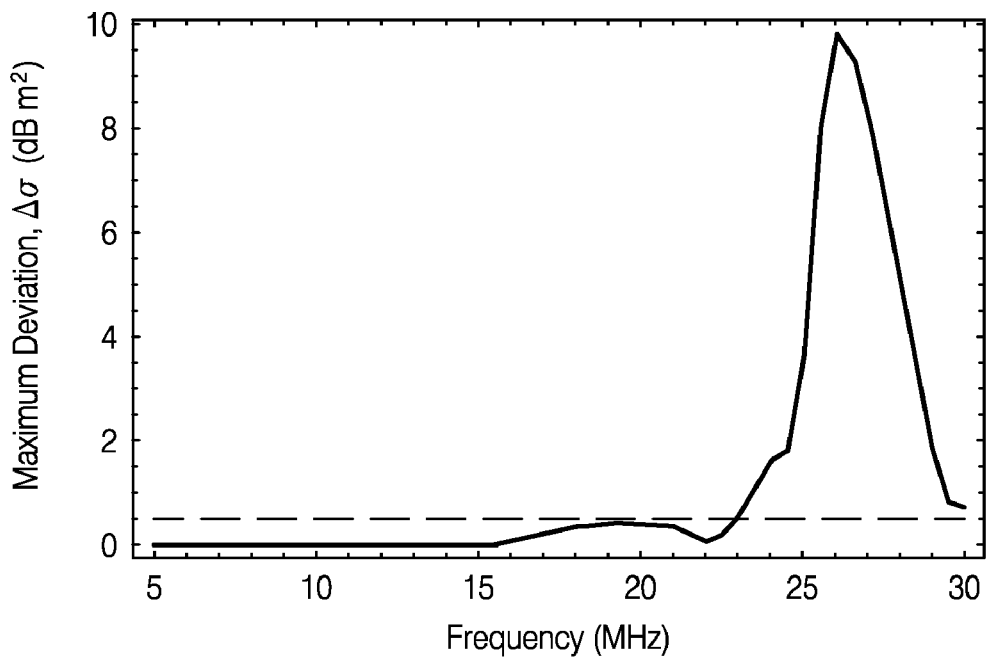
FIG. 9 illustrates the effect of contact resistance on maximum variation in high frequency cross-section.
Figure 10:
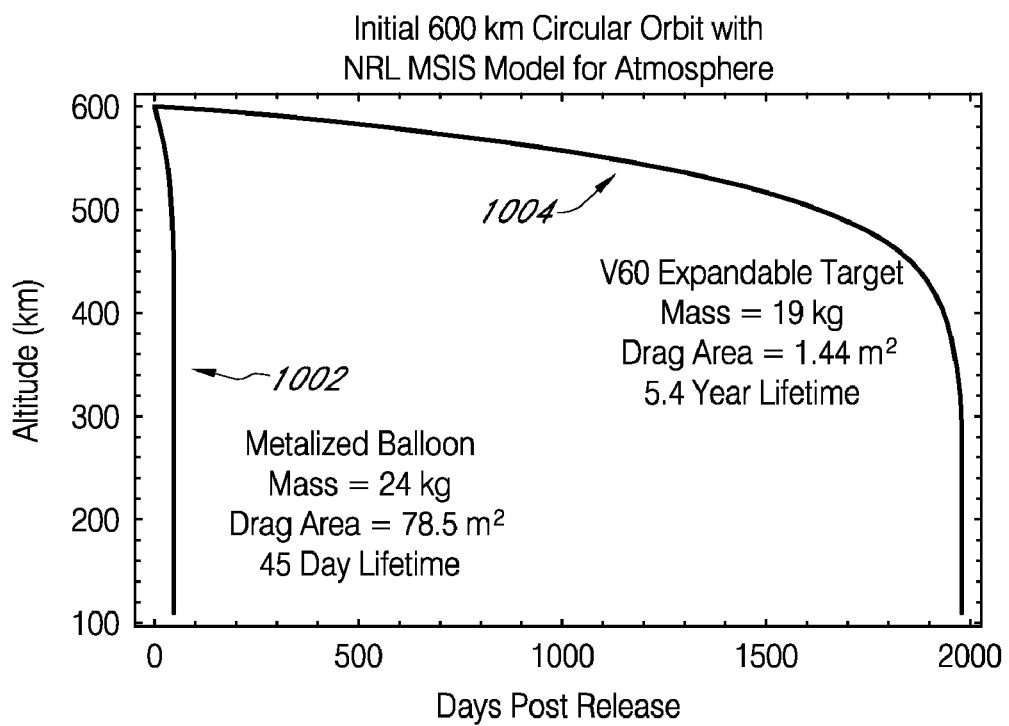
FIG. 10 illustrates a comparison of effect on orbit lifetime due to atmospheric drag between one embodiment of an expandable calibration target and a metalized balloon.

To determine the effects of hinge resistance, the radar cross-section is considered for an expandable calibration target with 60 vertices. Fixed resistance is added to 30 out of 90 edges in the fully expanded calibration target. A resistance of 1 Ohm in the 30 edges has insignificant effects on radar cross-section. With a resistance of 10 Ohms in the 30 edges, the total radar cross-section is altered by approximately 0.5 dB for frequencies above 10 MHz and, as illustrated in FIG. 9, variation in radar cross-section with viewing angle changes by a maximum of 0.12 dB. Thus, if resistance at each contact point is less than 10 Ohms, the expandable calibration target will provide a good approximation to know radar cross-section within 0.5 dB at a given radar frequency. Conductive components of the expandable calibration target may thus be chosen to limit corrosion at conductive interfaces. In some embodiments the conductive components include gold.

FIG. 9 is a graph illustrating the maximum deviation versus frequency in MHz. As noted above, with regard to FIG. 8, above 23 MHz, the local maximum in high frequency signal variation with orientation is found to be 9.6 dB at 26 MHz.

A precise orbit determination is needed for accurate validation of target location for ground high frequency signals. Microprocessors and/or software modules may be used to calculate and/or display target location for ground high frequency signals. The primary perturbation on the orbit of the expandable target will be atmospheric drag. Atmospheric drag ultimately limits the lifetime of the target in orbit. The satellite acceleration (or deceleration) due to drag is given by the equation:

$$\frac{\partial^2 r}{\partial t^2} = -\frac{C_D}{2} \frac{A}{m} \rho v_r^2 e_r$$

where r is the geometric radius, $C_D$ is the drag coefficient assumed to have a value of 2, A is the projected 2-D cross-section area of the metal object, m is the mass, r is the neutral mass density of the atmosphere, $v_r^2$ is the speed of the sphere with respect to the medium, and $e_r$ is the unit vector in the direction of the orbit. The actual neutral density profiles will vary with the season and solar cycle, but the one selected for the drag calculations is representative of minimum solar activity at Equinox. Line 1002 models atmospheric drag for a metalized balloon with a mass of 24 kg and a drag area of 78.5 $m^2$. The metalized balloon lasts only 45 days in orbit. In contrast, line 1004 models atmospheric drag for a 60-vertice expandable target with a mass of 19 kg and a drag area of 1.44 $m^2$. The expandable target lasts 5.4 years.

Numerically integrating for circular orbits will yield a time history of the orbiting sphere. The mass and drag area for a fully metalized target with a 30 μm thick spherical shell is estimated to be approximately 43 kg and 78 $m^2$, respectively resulting in an area to mass ratio of 1.84 $m^2$/kg. When this solid surface spheroid is injected into orbit at 450 km, it will have a lifetime of only five days. See FIG. 5 for a metalized balloon 802. In contrast, an expandable target 800 may remain in orbit for over half a year. In this particular embodiment of an expandable target 800, the wireframe comprises a gold-plated aluminum frame with 8 cm thicknesses on the struts. If the wireframe were instead made from a more dense material, for example gold-plated steel, the mass would increase to 143 kg and the expandable target would stay in orbit almost two years. Thus, the area to mass ratio would be similar for 60-vertices in a higher order wire frame. Consequently, the orbit lifetime would be greater than 600 days for orbits above 450 km altitude. Even though the details of the orbit lifetime will vary with the number of vertices and the background neutral density, the expandable signal calibration targets of the present disclosure have obvious advantages over metal spherical balloons 802.

The foregoing description details certain embodiments of the invention. It will be appreciated, however, that no matter how detailed the foregoing appears in the text, the invention can be practiced in additional ways. It should also be noted that the use of particular terminology when describing certain features or aspects of the invention should not be taken to imply that the terminology is being re-defined herein to be restricted to include any specific characteristics of the features or aspects of the invention with which that terminology is associated. Further, numerous applications are possible for devices of the present disclosure. It will be appreciated by those skilled in the art that various modifications and changes may be made without departing from the scope of the invention. Such modifications and changes are intended to fall within the scope of the invention, as defined by the appended claims.

What is claimed is:

1. A high frequency signal calibration target deployable in outer space, comprising an expandable and electrically conductive symmetric structure, wherein the structure comprises a plurality of vertices and further comprises a plurality of spring-loaded hinges each attached to a respective said vertice.

2. The high frequency signal calibration target of claim 1, wherein the spring-loaded hinges comprise torsion springs configured to apply pressure to the hinges when the structure is in the deployed state.

3. The high frequency signal calibration target of claim 1, wherein the spring-loaded hinges comprise a conductivity surface material.

4. The high frequency signal calibration target of claim 3, wherein the conductivity surface material comprises gold.

5. The high frequency signal calibration target of claim 1 further comprising scissor arms attached to the plurality of spring-loaded hinges.

6. A method of calibrating a high frequency signal, comprising:
launching an electrically conductive and expandable symmetric structure into orbit in outer space, wherein the structure comprises a plurality of vertices and further comprises a plurality of spring-loaded hinges each attached to a respective said vertice; and
expanding the structure from a diameter less than 2 m to a diameter greater than 8 m.

7. The method of claim 6, wherein launching the structure into orbit in outer space comprises contracting the conducting structure to a first volume with a diameter of less than 2 m.

8. The method of claim 6 further comprising aiming a high frequency signal device at the structure.

9. The method of claim 6 further comprising
transmitting a high frequency signal off of the structure; and
measuring scatter of the high frequency signal off of the structure.

10. A method of calibrating a high frequency signal, comprising:
aiming a high frequency signal device at an expandable and electrically conductive symmetric structure, wherein the structure comprises a plurality of vertices and further comprises a plurality of spring-loaded hinges each attached to a respective said vertice;
transmitting a high frequency signal off of the structure; and
measuring scatter of the high frequency signal off of the structure.

11. A method of locating a calibration target, comprising:
aiming a laser at an expandable and electrically conductive symmetric structure, wherein the structure comprises a plurality of vertices and further comprises a plurality of spring-loaded hinges each attached to a respective said vertice;
transmitting a laser pulse off of the structure; and
measuring laser scatter from the structure to locate the calibration target.

12. The method of claim 11, wherein measuring laser scatter on the structure comprises measuring laser scatter from a predetermined fixed location on the structure.

13. The method of claim 12, wherein the fixed location comprises a corner vertex of the structure.

14. The method of claim 13, wherein the corner vertex comprises a corner retro-reflector.

15. The method of claim 14, wherein measuring laser scatter off the retro-reflector determines the orientation of the structure.

* * * * *

UNITED STATES PATENT AND TRADEMARK OFFICE
CERTIFICATE OF CORRECTION

PATENT NO. : 7,948,425 B2
APPLICATION NO. : 12/120407
DATED : May 24, 2011
INVENTOR(S) : Paul A Bernhardt et al.

Page 1 of 1

It is certified that error appears in the above-identified patent and that said Letters Patent is hereby corrected as shown below:

Title Page, Item (73) Assignee should read
 (73) Assignees: The Government of the United States of America, as represented by the Secretary of the Navy, Washington, DC (US); Cornell University, Ithaca, NY (US)

Signed and Sealed this
Twenty-ninth Day of November, 2011

David J. Kappos
*Director of the United States Patent and Trademark Office*